US008397300B2

(12) United States Patent
Tripp

(10) Patent No.: US 8,397,300 B2
(45) Date of Patent: Mar. 12, 2013

(54) DETECTING SECURITY VULNERABILITIES RELATING TO CRYPTOGRAPHICALLY-SENSITIVE INFORMATION CARRIERS WHEN TESTING COMPUTER SOFTWARE

(75) Inventor: Omer Tripp, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 668 days.

(21) Appl. No.: 12/564,288

(22) Filed: Sep. 22, 2009

(65) Prior Publication Data

US 2011/0072517 A1    Mar. 24, 2011

(51) Int. Cl.
   *G06F 21/00*    (2006.01)
   *G06F 9/44*     (2006.01)
(52) U.S. Cl. ............ 726/25; 726/22; 717/124; 717/125; 717/126; 717/127; 717/128
(58) Field of Classification Search .................... 725/25; 380/1, 189; 719/328–332; 717/124–128; 726/22, 25

See application file for complete search history.

(56) References Cited

U.S. PATENT DOCUMENTS

| | | | | |
|---|---|---|---|---|
| 6,006,328 | A * | 12/1999 | Drake | 726/23 |
| 7,210,123 | B2 * | 4/2007 | Makiyama | 717/120 |
| 7,610,625 | B2 * | 10/2009 | Matsumoto | 726/25 |
| 7,845,006 | B2 * | 11/2010 | Akulavenkatavara et al. | 726/22 |
| 8,024,807 | B2 * | 9/2011 | Hall et al. | 726/25 |
| 2003/0221116 | A1 * | 11/2003 | Futoransky et al. | 713/189 |
| 2005/0273861 | A1 * | 12/2005 | Chess et al. | 726/25 |
| 2006/0020822 | A1 * | 1/2006 | Aigner et al. | 713/189 |
| 2006/0253841 | A1 * | 11/2006 | Rioux | 717/127 |
| 2007/0006314 | A1 * | 1/2007 | Costa et al. | 726/25 |

(Continued)

FOREIGN PATENT DOCUMENTS

WO    WO 2008/047351 A2    4/2008

OTHER PUBLICATIONS

William G. J. Halfond and Alessandro Orso: "COmbining static analysis and runtime monitoring to counter SQL-injection attacks", WODA'05 Proceedings of the third international workshop on Dynamic analysis, New York, ACM SoftwareEngineering Notes vol. 30 Issue 4, Jul. 2005.*

(Continued)

*Primary Examiner* — Catherine Thiaw
(74) *Attorney, Agent, or Firm* — VanLeeuwen & VanLeeuwen; Terrence J. Carroll

(57) ABSTRACT

A system for detecting security vulnerabilities in computer software, including a cryptographic API identifier configured to identify a cryptographic API among the instructions of a computer software application, a path-to-source tracer configured to trace an information flow path among the instructions between the cryptographic API and a source that directly or indirectly provides data that are input to the cryptographic API, where a cryptographically-sensitive information carrier lies along the information flow path, a path-to-sink tracer configured to trace an information flow path among the instructions from the cryptographically-sensitive information carrier to a sink, and a security vulnerability identifier configured to provide a notification that the information flow path between the cryptographically-sensitive information carrier and the sink represents security vulnerability if the information flow path between the cryptographically-sensitive information carrier and the sink does not pass through a cryptographic API.

5 Claims, 3 Drawing Sheets

U.S. PATENT DOCUMENTS

| | | | |
|---|---|---|---|
| 2007/0074188 A1* | 3/2007 | Huang et al. | 717/141 |
| 2007/0234304 A1* | 10/2007 | Berg et al. | 717/126 |
| 2008/0060077 A1* | 3/2008 | Cowan et al. | 726/25 |
| 2008/0168562 A1* | 7/2008 | Haga et al. | 726/23 |
| 2009/0038015 A1* | 2/2009 | Diamant et al. | 726/25 |
| 2009/0276839 A1* | 11/2009 | Peneder | 726/8 |
| 2009/0327943 A1* | 12/2009 | Medvedev et al. | 715/772 |
| 2010/0031353 A1* | 2/2010 | Thomas et al. | 726/22 |
| 2010/0050263 A1* | 2/2010 | Weisman | 726/25 |
| 2010/0058475 A1* | 3/2010 | Thummalapenta et al. | 726/25 |
| 2010/0281248 A1* | 11/2010 | Lockhart et al. | 713/150 |
| 2010/0281270 A1* | 11/2010 | Miyazaki et al. | 713/189 |
| 2011/0055813 A1* | 3/2011 | Calendino et al. | 717/124 |

OTHER PUBLICATIONS

Chris Wysopal et al., "Static Detection of Application Backdoors", veracode.com URL: http://www.veracode.com/images/stories/static-detection-of-backdoors-1.0.pdf), Aug. 2, 2007.

B. Livshits et al., "Merlin: Specification Inference for Explicit Information Flow Problems", PLDI'09, Jun. 2009.

L. Tan et al., "AutoISES: Automatically Inferring Security Specifications and Detecting Violations", 17th Usenix Security Symposium. https://www.usenix.org/events/sec08/tech/full_papers/tan_I/tan_I.pdf, 2008.

V. Ganapathy et al., "Mining Security-Sensitive Operations in Legacy Code Using Concept Analysis", 29th International Conference on Software Engineering, 2007.

* cited by examiner

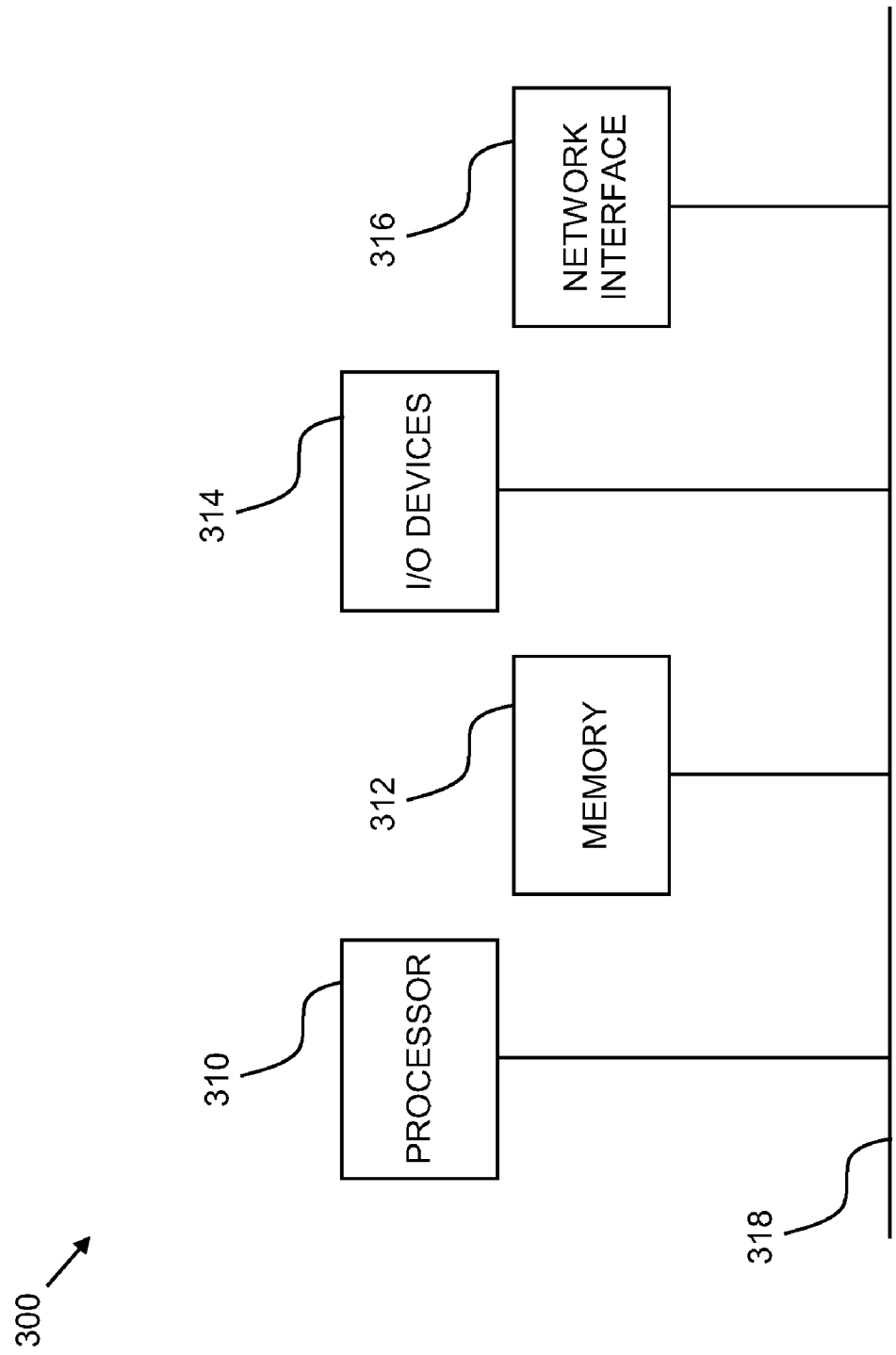

DETECTING SECURITY VULNERABILITIES RELATING TO CRYPTOGRAPHICALLY-SENSITIVE INFORMATION CARRIERS WHEN TESTING COMPUTER SOFTWARE

FIELD OF THE INVENTION

The invention relates to computer software testing in general, and more particularly to detecting security vulnerabilities relating to cryptographically-sensitive information carriers when testing computer software.

BACKGROUND OF THE INVENTION

Static analyzers are well known tools that provide information about computer software while applying only static considerations (i.e., without executing a computer software application). In one type of static analysis, information flows are traced within a computer software application from sources, being application programming interfaces (APIs) that introduce input into an application from external sources, such as user input, to sinks, being security-sensitive operations, such as operations that output information to users. Such flows are often identified by static analyzers as security risks that may require further analysis by a software developer and possibly corrective action. However, many such information flows may encounter one or more points within the application that validate or otherwise process data related to the information flow with the express purpose of eliminating the information flow as a security risk. One example of this relates to encrypting input received from external sources, such as user passwords or credit card numbers. It would be advantageous to automatically identify information flows that undergo such processing so as to reduce the need for further analysis by a software developer.

SUMMARY OF THE INVENTION

The invention in embodiments thereof discloses novel systems and methods for detecting security vulnerabilities relating to cryptographically-sensitive information carriers when testing computer software.

In one aspect of the invention a system is provided for detecting security vulnerabilities in computer software, the system including a cryptographic API identifier configured to identify at least one cryptographic API among the instructions of a computer software application, a path-to-source tracer configured to trace at least one information flow path among the instructions between the cryptographic API and at least one source that directly or indirectly provides data that are input to the cryptographic API, where at least one cryptographically-sensitive information carrier lies along the information flow path, a path-to-sink tracer configured to trace at least one information flow path among the instructions from the cryptographically-sensitive information carrier to at least one sink, and a security vulnerability identifier configured to provide a notification that the information flow path between the cryptographically-sensitive information carrier and the sink represents security vulnerability if the information flow path between the cryptographically-sensitive information carrier and the sink does not pass through a cryptographic API.

In another aspect of the invention the cryptographic API identifier is configured to identify the cryptographic APIs by matching any of the instructions against a predefined set of cryptographic APIs.

In another aspect of the invention a method is provided for detecting security vulnerabilities in computer software, the method including identifying at least one cryptographic API among the instructions of a computer software application, tracing at least one information flow path among the instructions between the cryptographic API and at least one source that directly or indirectly provides data that are input to the cryptographic API, where at least one cryptographically-sensitive information carrier lies along the information flow path, tracing at least one information flow path among the instructions from the cryptographically-sensitive information carrier to at least one sink, and providing a notification that the information flow path between the cryptographically-sensitive information carrier and the sink represents security vulnerability if the information flow path between the cryptographically-sensitive information carrier and the sink does not pass through a cryptographic API.

In another aspect of the invention the identifying step includes identifying the cryptographic APIs by matching any of the instructions against a predefined set of cryptographic APIs.

In another aspect of the invention a computer program product is provided for detecting security vulnerabilities in computer software, the computer program product including a computer readable medium, and computer program instructions operative to identify at least one cryptographic API among the instructions of a computer software application, trace at least one information flow path among the instructions between the cryptographic API and at least one source that directly or indirectly provides data that are input to the cryptographic API, where at least one cryptographically-sensitive information carrier lies along the information flow path, trace at least one information flow path among the instructions from the cryptographically-sensitive information carrier to at least one sink, and provide a notification that the information flow path between the cryptographically-sensitive information carrier and the sink represents security vulnerability if the information flow path between the cryptographically-sensitive information carrier and the sink does not pass through a cryptographic API, where the program instructions are stored on the computer readable medium.

BRIEF DESCRIPTION OF THE DRAWINGS

The invention will be understood and appreciated more fully from the following detailed description taken in conjunction with the appended drawings in which:

FIG. 3 is a simplified block diagram illustrating an exemplary hardware implementation of a computing system, constructed and operative in accordance with an embodiment of the invention.

DETAILED DESCRIPTION OF THE INVENTION

Figure 1:
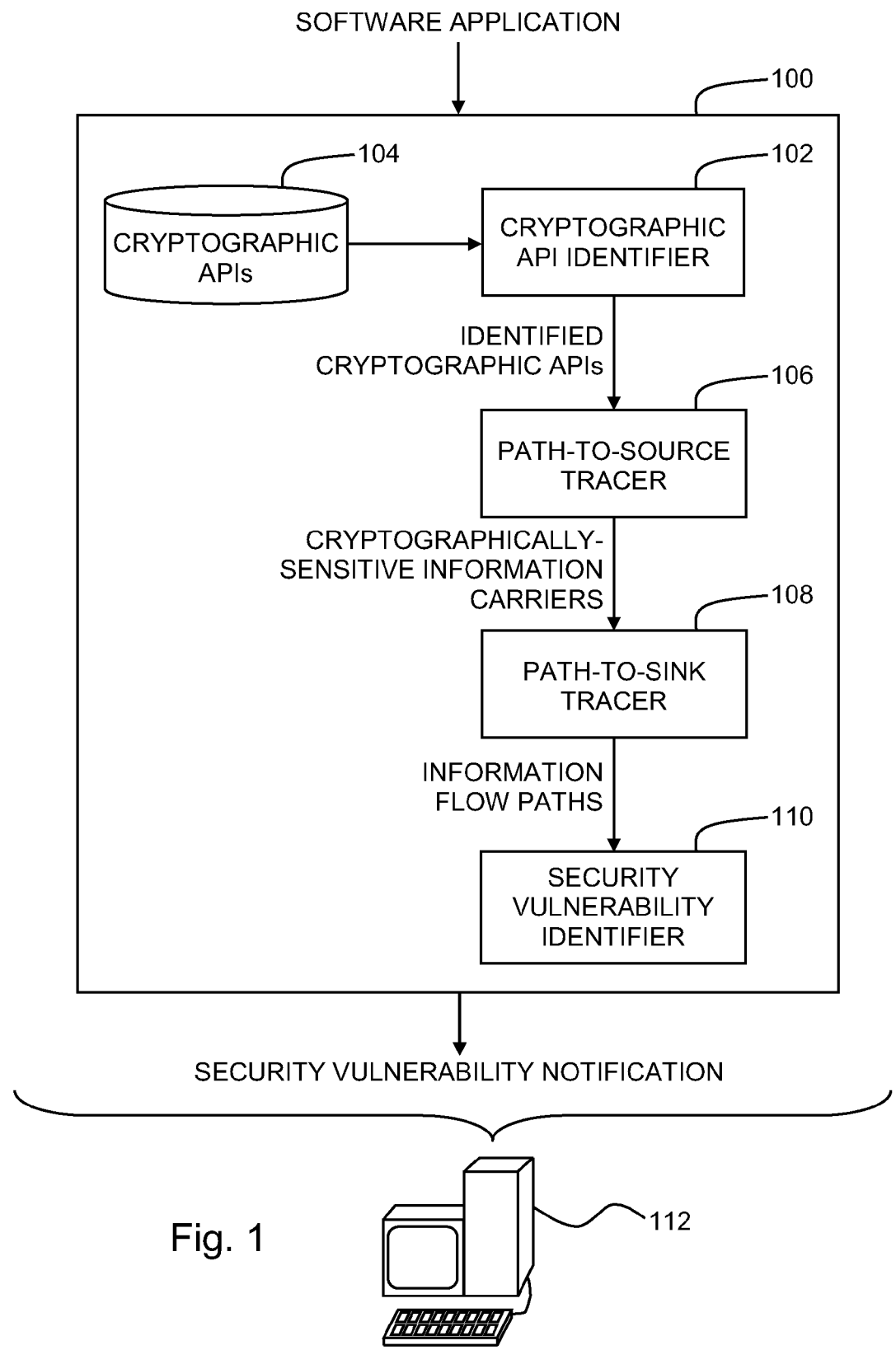
FIG. 1 is a simplified conceptual illustration of a system for detecting security vulnerabilities relating to cryptographically-sensitive information carriers when testing computer software, constructed and operative in accordance with an embodiment of the invention.

The invention is now described within the context of one or more embodiments, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, the invention may be embodied as a system, method or computer program product. Accordingly, the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Reference is now made to FIG. 1 which is a simplified conceptual illustration of a system for detecting security vulnerabilities relating to cryptographically-sensitive information carriers when testing computer software, constructed and operative in accordance with an embodiment of the invention. In the system of FIG. 1, a static analyzer 100 is provided for statically analyzing the instructions of a computer software application, such as where the instructions are in the form of source code or bytecode. Static analyzer 100 is configured to identify sources and sinks within the application using conventional techniques, and/or sources and sinks may be manually identified and made known to static analyzer 100. Static analyzer 100 preferably includes a cryptographic API identifier 102 that is configured to identify any cryptographic APIs within the application, such as by matching application instructions against a predefined set 104 of cryptographic APIs. Static analyzer 100 also preferably includes a path-to-source tracer 106 that uses techniques such as backward slicing to trace among the instructions one or more information flow paths between the cryptographic APIs identified by cryptographic API identifier 102 and any sources that directly or indirectly provide data that are input to the identified cryptographic APIs. The information carriers that lie along the information flow paths identified by path-to-source tracer 106 are now referred to as cryptographically-sensitive information carriers and include data variables, pointers to data, or any other data representations. Static analyzer 100 also preferably includes a path-to-sink tracer 108 that uses techniques such as forward slicing to trace among the instructions information flow paths between the cryptographically-sensitive information carriers and any sinks. A security vulnerability identifier 110 determines whether or not any information flow path between a cryptographically-sensitive information carrier and a sink passes through a cryptographic API as identified by cryptographic API identifier 102, and preferably provides a notification, such as via a display of a computer 112, that a security vulnerability may exist regarding any information flow path between a cryptographically-sensitive information carrier and a sink that does not pass through a cryptographic API.

Figure 2:
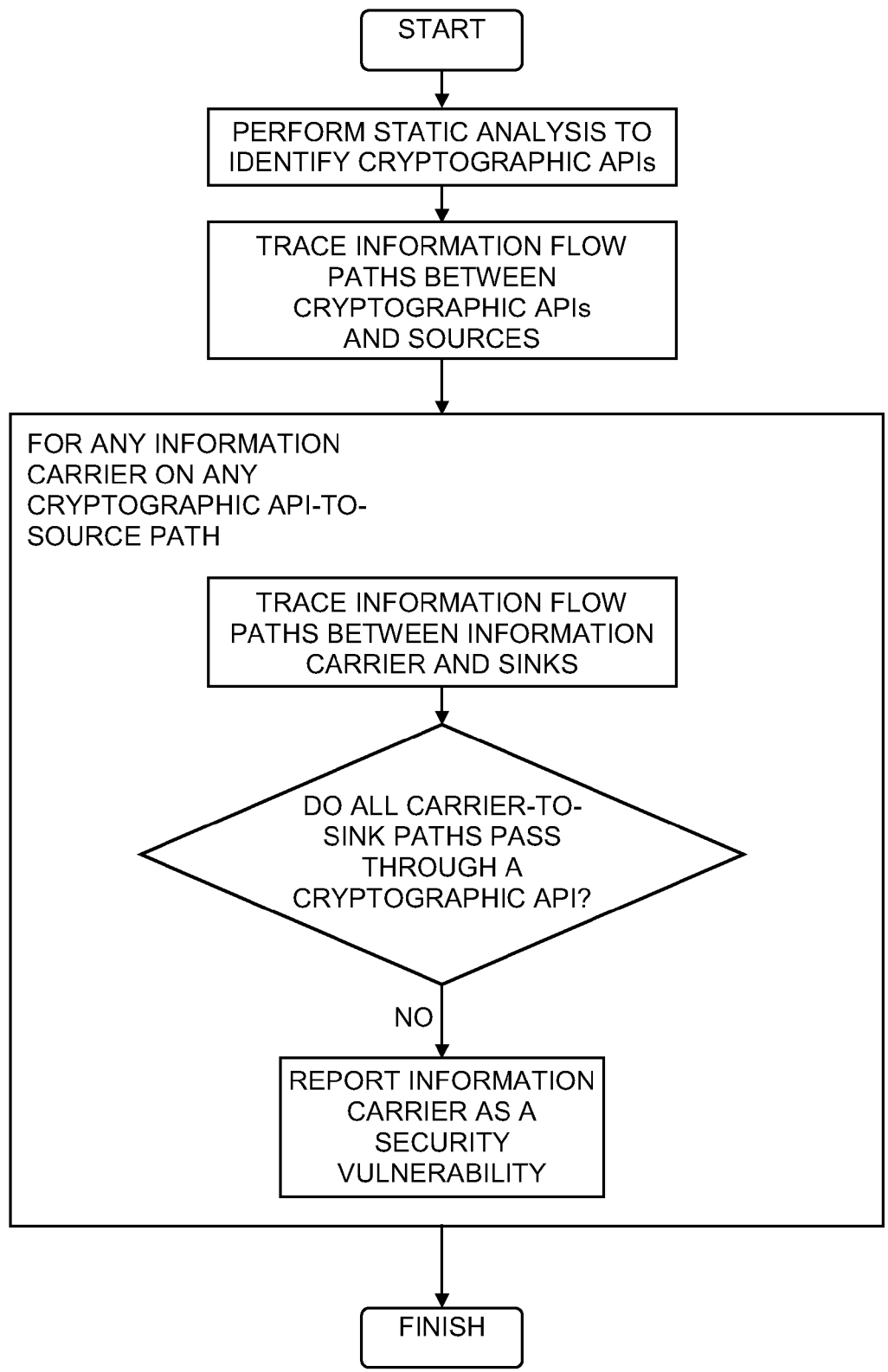
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2, static analysis is performed to identify cryptographic APIs among the instructions of a computer software application. Information flow paths are traced among the instructions between cryptographic APIs and any sources that directly or indirectly provide data that are input to the identified cryptographic APIs. Information flow paths are then traced among the instructions between the information carriers that lie along the information flow paths identified in the previous step, these information carriers now referred to as cryptographically-sensitive information carriers, and any sinks. If an information flow path between a cryptographically-sensitive information carrier and a sink does not pass through a cryptographic API, a notification is provided indicating a security vulnerability associated with the information flow path.

It will be appreciated that any aspect of the invention described hereinabove may be implemented as a computer program product embodied in a computer-readable medium, such as in the form of computer program instructions stored on magnetic, optical, or other physical storage media or embedded within computer hardware, and may be executed by or otherwise accessible to computer 112 (FIG. 1).

The system and method of FIGS. 1 and 2 may be understood within the context of the following exemplary scenario. Given the following application instructions to be analyzed

```
String s = getString("password");
String s1 = s;
s = EncryptionUtils.encrypt(s);
print(s);
print(s1);
``` and assuming that 'getString( )' is identified as a source, 'print( )' is identified as a sink, and 'encrypt( )' is identified as a cryptographic API, the value contained in variable 's' is traced to ensure that in all cases where it is directly or indirectly passed to a sink, it is first processed by a cryptographic API. In the example above, the assignment 's1=s;' followed by the call 'print(s1)' shows that the data stored in 's' that is meant to be encrypted is output via 'print(s1)' without being encrypted. This constitutes a security violation.

By applying the system and method of FIGS. 1 and 2,
  'EncryptionUtils.encrypt(s)' is identified as a cryptographic API;
  A first information flow path is traced from 'EncryptionUtils.encrypt(s)' via input 's' to the source statement 'String s=getString("password");'
  Variable 's' is identified as a cryptographically-sensitive information carrier;
  A second information flow path is traced from 'String s=getString("password");' via the assignment statement 'String s1=s;', and to the 'print(s1)' sink;
  The second information-flow path is identified as a security vulnerability since the second information-flow path exists between a cryptographically-sensitive information carrier (i.e., 's'), and a sink (i.e., 'print(s1)') but does not pass through a cryptographic API;
  A notification is made identifying the second information-flow path as a security vulnerability.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A system for detecting security vulnerabilities in computer software, the system comprising:
  a cryptographic API identifier configured to identify at least one cryptographic API among the source code instructions of a computer software application;

a path-to-source tracer configured to trace at least one information flow path among said source code instructions between said cryptographic API and at least one source procedure that directly or indirectly provides data that are input to said cryptographic API, wherein at least one cryptographically-sensitive information carrier lies along said information flow path;

a path-to-sink tracer configured to trace at least one information flow path among said source code instructions from said cryptographically-sensitive information carrier to at least one sink procedure; and a security vulnerability identifier configured to provide a notification that said information flow path between said cryptographically-sensitive information carrier and said sink procedure represents security vulnerability if said information flow path between said cryptographically-sensitive information carrier and said sink procedure does not pass through a cryptographic API, wherein said cryptographic API identifier, path-to-source tracer, path-to-sink tracer, and security vulnerability identifier are implemented in either of
  a) computer hardware configured to perform the functions of said cryptographic API identifier, path-to-source tracer, path-to-sink tracer, and security vulnerability identifier, and
  b) computer software embodied in a non-transitory, tangible, computer-readable storage medium.

2. A system according to claim 1 wherein said cryptographic API identifier is configured to identify said cryptographic APIs by matching any of said source code instructions against a predefined set of cryptographic APIs.

3. A method for detecting security vulnerabilities in computer software, the method comprising:

identifying at least one cryptographic API among the source code instructions of a computer software application;

tracing at least one information flow path among said source code instructions between said cryptographic API and at least one source procedure that directly or indirectly provides data that are input to said cryptographic API, wherein at least one cryptographically-sensitive information carrier lies along said information flow path;

tracing at least one information flow path among said source code instructions from said cryptographically-sensitive information carrier to at least one sink procedure; and providing a notification that said information flow path between said cryptographically-sensitive information carrier and said sink procedure represents security vulnerability if said information flow path between said cryptographically-sensitive information carrier and said sink procedure does not pass through a cryptographic API, wherein said identifying, tracing, and providing steps are implemented in either of
  a) computer hardware configured to perform said identifying, tracing, and providing steps, and
  b) computer software embodied in a non-transitory, tangible, computer-readable storage medium.

4. A method according to claim 3 wherein said identifying step comprises identifying said cryptographic APIs by matching any of said source code instructions against a predefined set of cryptographic APIs.

5. A computer program product for detecting security vulnerabilities in computer software, the computer program product comprising:

a non-transitory, tangible, computer-readable storage medium; and computer program instructions operative to
  identify at least one cryptographic API among the source code instructions of a computer software application,
  trace at least one information flow path among said source code instructions between said cryptographic API and at least one source procedure that directly or indirectly provides data that are input to said cryptographic API, wherein at least one cryptographically-sensitive information carrier lies along said information flow path,
  trace at least one information flow path among said source code instructions from said cryptographically-sensitive information carrier to at least one sink procedure, and
  provide a notification that said information flow path between said cryptographically-sensitive information carrier and said sink procedure represents security vulnerability if said information flow path between said cryptographically-sensitive information carrier and said sink procedure does not pass through a cryptographic API, wherein said computer program instructions are stored on said computer readable storage medium.

* * * * *